United States Patent
Hengst

[11] Patent Number: 6,005,299
[45] Date of Patent: *Dec. 21, 1999

[54] ELECTRONIC APPARATUS PROVIDED WITH A BIDIRECTIONAL ROTARY SWITCH

[75] Inventor: Axel Hengst, Lahnau, Germany

[73] Assignee: VDO Control Systems, Inc., Germany

[*] Notice: This patent issued on a continued prosecution application filed under 37 CFR 1.53(d), and is subject to the twenty year patent term provisions of 35 U.S.C. 154(a)(2).

[21] Appl. No.: 08/935,595

[22] Filed: Sep. 23, 1997

[30] Foreign Application Priority Data

Sep. 24, 1996 [DE] Germany .............................. 196 39 119

[51] Int. Cl.⁶ .................................................. H01H 19/46
[52] U.S. Cl. ..................... 307/10.1; 200/519; 340/425.5; 345/902; 701/36
[58] Field of Search .................................. 200/519, 17 R, 200/316; 307/9.1, 10.1; 701/1, 29, 36, 49, 116, 117, 200–226, 300, 302; 340/425.5, 438, 459, 461, 462, 990, 995; 345/145, 146, 157, 204, 902, 352, 353, 356, 357

[56] References Cited

U.S. PATENT DOCUMENTS

| | | |
|---|---|---|
| 3,761,649 | 9/1973 | Jedynak et al. .................. 200/17 R X |
| 4,131,033 | 12/1978 | Wright et al. ............................ 200/316 |
| 4,963,889 | 10/1990 | Hatch . |
| 4,972,431 | 11/1990 | Keegan . |
| 5,012,056 | 4/1991 | Abel et al. ............................... 200/519 |
| 5,040,240 | 8/1991 | Keegan . |
| 5,270,689 | 12/1993 | Hermann ................................. 345/145 |
| 5,402,117 | 3/1995 | Zijderhand . |
| 5,488,611 | 1/1996 | Zijderhand et al. . |
| 5,516,295 | 5/1996 | Stove . |
| 5,592,665 | 1/1997 | Lahaije . |
| 5,652,911 | 7/1997 | VanVenrooy et al. . |
| 5,673,401 | 9/1997 | Volk et al. ............................... 345/356 |
| 5,771,459 | 6/1998 | Demery et al. . |
| 5,887,269 | 3/1999 | Brunts et al. ............................ 340/990 |

FOREIGN PATENT DOCUMENTS

0366132B1   5/1990   European Pat. Off. .

Primary Examiner—Richard T. Elms
Attorney, Agent, or Firm—Mayer, Brown and Platt

[57] ABSTRACT

An electronic apparatus provided with a bidirectional rotary switch having a control element for selecting individual function elements of function groups by rotation of the control element, and for activating the individual function elements by pushing the control element, and where the selected or activated function group and/or a function is exited by pulling the control element.

13 Claims, 2 Drawing Sheets

ELECTRONIC APPARATUS PROVIDED WITH A BIDIRECTIONAL ROTARY SWITCH

BACKGROUND OF THE INVENTION

The invention relates to an electronic apparatus provided with a bidirectional rotary switch
  for selecting individual function elements of function groups by rotation of the rotary switch, and
  for activating the individual function elements by pushing the rotary switch, at least one function and/or one function group being addressable in this manner.

An electronic apparatus of this kind is known, for example from EP 366 132 B1. The rotary switch of the known apparatus has lock-in positions which are associated with individual function elements. The individual function elements can be successively selected by rotation of the rotary switch. A selected function element is activated, i.e. an enter function is initialized, by pushing the rotary switch. The individual function elements may be provided for initializing a function as well as for addressing another function group, notably function sub-groups. In order to reach a subordinate function group from a higher-level function group, the function element of the subordinate function group must be selected in the higher level function group by rotation and be activated by pushing. In order to reach a higher-level function group from a subordinate function group, the subordinate function group is provided with a function element of the higher level function group; this function element can be selected by rotation and activated by pushing, so that a change over to the higher level function group takes place.

OBJECTS AND SUMMARY OF THE INVENTION

It is an object of the invention to provide an electronic apparatus of the kind set forth which enables the user to switch simply and intuitively between the individual function groups.

This object is achieved according to the invention in that it is possible to leave a function group and/or a function by pulling the rotary switch.

In an electronic apparatus of this kind it is not necessary to designate a function element for leaving the function group or the function upon activation. Leaving the function group or the function can always be initiated by pulling the rotary switch. Consequently, space is vacated for other information on the display screen.

The control of such a rotary switch is intuitive. Pushing the rotary switch can be readily associated with the operation "selecting the function element". Pulling the rotary knob is the opposite operation, both physically and logically, i.e. leaving the current function group or function.

The rotary mechanism can be implemented by means of an incrementation member without a stop. Positive coupling exists between the rotary motion and the display on the display screen, i.e. each mechanical step of the incrementation member induces an advance to a next function element. Consequently, the individual function elements of a function group can also be selected without eye contact.

An attractive embodiment of the invention is characterized in that the function groups are hierarchically structured and that a respective pulling motion of the rotary switch is provided for the addressing of a respective higher level function group.

When the function groups are hierarchically structured, a pulling motion of the rotary switch always addresses the higher level function group, irrespective of which function element is selected in the current function group.

For the selection of a subordinate function group first the corresponding function element must be selected by rotation of the rotary switch, said function element addressing the desired subordinate function group upon activation. After selection of the desired function element, it is activated by pushing the rotary switch and the desired subordinate function group is addressed.

The main function group of an on-board monitor system of a vehicle may include, for example the function elements navigation, radio, board computer, telephone and television. For example, if the function element radio is selected by means of the rotary switch and activated by pushing the rotary switch, the function group radio is addressed; this group may include the function elements cassette, tuner and CD. If the function element cassette in the function group radio is selected and activated by pushing the rotary switch, the function group cassette is addressed which may include, for example the function elements "forward play", "backward play", "forward winding", and "rewinding". If the function element "forward play" is activated by pushing the rotary switch, the function "forward play" is executed. On the display screen there could then be displayed, for example information concerning the playing time of the individual titles, the remaining playing time etc. The function group cassette can be addressed again by pulling the rotary switch. When the function group cassette has been "addressed", the higher level function group radio can be addressed by pulling the rotary knob again and the main function group can be addressed by pulling the rotary knob once more. This operation is independent of which function element of the function group was addressed at that instant. For example, if the rotary switch is pulled in the case of the function group cassette, the function group radio will always be addressed, irrespective of whether the function element "forward play", "backward play", "forward winding" or "rewinding " was selected prior to pulling.

A further attractive embodiment of the invention is characterized in that a respective function group with individual function elements is associated with each of the individual functions, and that a respective pulling motion of the rotary switch is provided so as to switch back and forth between the function and the function group associated with the function.

Each individual function in such a network-like menu structure is linked to a function group which, in dependence on the function, always includes one or more function elements relating to the function.

When a function element of a function group is activated, the associated function is executed; for example, information is displayed. At the same time the function elements of the function group associated with the function are displayed, without masking the information. As a result, the user always has an overall view of the function elements associated with a given function. If necessary because of lack of space, the function group with the function elements could also be temporarily masked by the function or it could appear only when requested.

Switching back and forth between the function and the function group associated with the function always takes place by way of the pulling motion of the rotary switch.

If the relevant function has been selected, the function group associated with the function is selected by pulling the rotary switch. The individual function elements of the function group can then be selected by rotation of the rotary switch and activated by pushing. Switching over from the function group to the function again can take place by pulling the rotary switch. Within the function, for example individual sub-function elements of the function can then be selected. These sub-function elements may also be associated with special function groups.

In order to reach function elements which are not present in the function group associated with a function, an additional hierarchically structured menu in which all function elements are present can be provided. To this end, for example each function group associated with a function could include a function element "menu". When this function element "menu" is activated by pushing the rotary switch, a hierarchical menu structure will be addressed.

In a further attractive embodiment of the invention, the rotary switch is biased in the direction of a central position so that it automatically returns to the central position when it is released.

Such a bias in the direction of the central position can be realized, for example by means of two springs. When the operator releases the rotary switch after a pushing or pulling motion, it is automatically returned to the central position by the spring bias. Reliable operation of the rotary switch is thus ensured during pushing and pulling motions. It is thus ensured notably that in the event of a plurality of successive pushing or pulling motions each individual pushing or pulling motion indeed activates only one function element or addresses only one higher level or previous function group.

In a further attractive embodiment of the invention the rotary function of the rotary switch is inhibited during the pushing motion and the pulling motion of the rotary switch.

A further attractive embodiment of the invention is characterized in that a pressure point is provided for mechanical confirmation of the pulling function and the pushing function.

The operator must overcome a pressure point during the pushing and pulling of the rotary switch. This provides the operator with a mechanical confirmation that an operation has indeed been performed by the pushing or the pulling.

A further attractive embodiment of the invention is characterized in that there is provided an additional function which takes effect when the rotary switch is pulled for more than a presettable period of time.

Such an additional function may be, for example the returning to the main function group if the rotary switch is pulled for, for example more than 3 seconds.

The electronic apparatus according to the invention is preferably used in a navigation system.

BRIEF DESCRIPTION OF THE DRAWINGS

Some embodiments of the invention will be described in detail hereinafter with reference to FIGS. 1 to 4 of the drawing. Therein.

DETAILED DESCRIPTION OF THE PREFERRED EMBODIMENT

Figure 1:
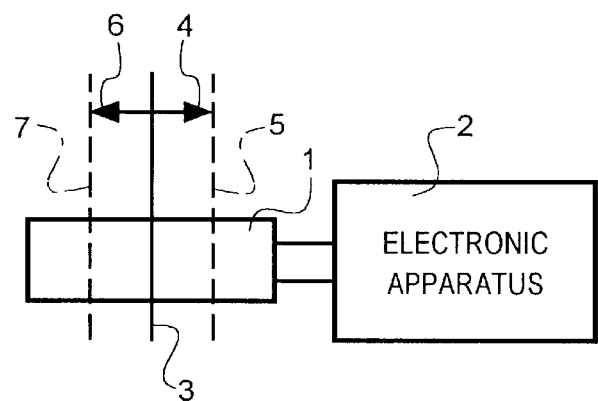
FIG. 1 is a side elevation of the basic construction of the rotary switch according to the invention.

FIG. 1 is a side elevation of a rotary switch 1 of a diagrammatically shown electronic apparatus 2. The rotary switch 1 is in a central position 3. From the central position 3 the rotary knob 1 can be pushed in the direction of the arrow 4 so as to reach a pushed position 5. From the central position 3, the rotary knob 1 can be pulled in the opposite direction, i.e. in the direction of an arrow 6, so as to reach a pulled position 7. The rotary knob 1 is biased in the direction of the central position 3 by means of springs (not shown) so that when it is released by the operator, it automatically returns to the central position 3 from the pushed position 5 as well as from the pulled position 7.

Figure 2:
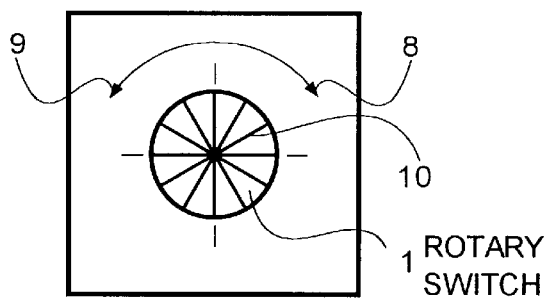
FIG. 2 is a plan view of the basic construction of the rotary switch.

FIG. 2 is a plan view of the rotary knob 1 of FIG. 1. An operator can turn the rotary knob 1 clockwise in the direction of the arrow 8 and also counter-clockwise in the direction of the arrow 9. The rotation mechanism of the rotary knob 1 is realized by means of an incrementation member without stop. The incrementation member subdivides a full rotation of the rotary switch into twelve steps in the present example. A lock-in position 10 is associated with each step.

Figure 3:
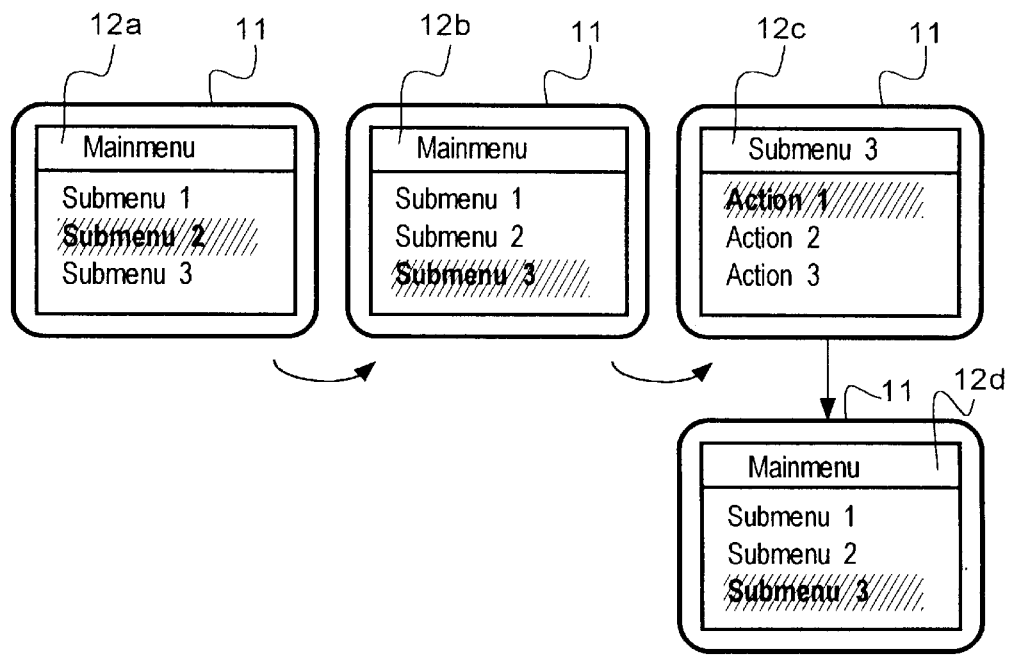
FIG. 3 shows four successive screen displays of a first embodiment with a hierarchical structure of function groups.

FIG. 3 shows a display screen 11 with four successive screen displays 12a, 12b, 12c and 12d, the individual function groups being hierarchically structured. In the screen display 12a the function group main menu has been called; this function group comprises the sub-menu 1, the sub-menu 2 and the sub-menu 3 as its function elements. The function element sub-menu 2 has been selected in the display 12a and hence is shown in an optically accentuated manner. The screen display 12b is obtained by turning the rotary switch 1 one step in the clockwise direction. In this screen display 12b the sub-menu 3 has been selected and hence displayed in an optically accentuated manner. In order to call the sub-menu 3, the function element sub-menu 3 of the function group main menu must be activated. This is realized by pushing the rotary switch 1. From the screen display 12b the screen display 12c is reached by pushing the rotary switch 1. In the screen display 12c the function group sub-menu 3 has been called; this sub-menu 3 has the function element action 1, the function element action 2 and the function element action 3 as its function elements. The function element action 1 has been selected and optically accentuated in the screen display 12c. The function elements action 2 and action 3 can be successively selected by turning the rotary switch 1 clockwise. In order to active one of the function elements action 1, action 2 and action 3, it must first be selected by rotation of the rotary switch 1 and subsequently be activated in the selected state by pushing the rotary switch 1.

The return from the function group sub-menu 3 to the higher-level function group main menu can be performed by pulling the rotary switch 1. The return from the function group sub-menu 3 to the function group main menu then takes place irrespective of the function element of the function group sub-menu 3 selected and optically accentuated at that instant. Upon the return from the function group sub-menu 3 to the function group main menu, that function element of the function group main menu which was selected when the function group main menu was left before is first selected and optically accentuated.

In the case of an on-board monitor system of a vehicle the sub-menu 1 may be, for example the sub-menu navigation, the sub-menu 2 the sub-menu radio and the sub-menu 3 the sub-menu-on-board computer. The sub-menu 3 (on-board computer menu) can then display, for example the fuel consumption as the action 1, the lubricant level as the action 2, and the tire pressure as the action 3.

Figure 4:
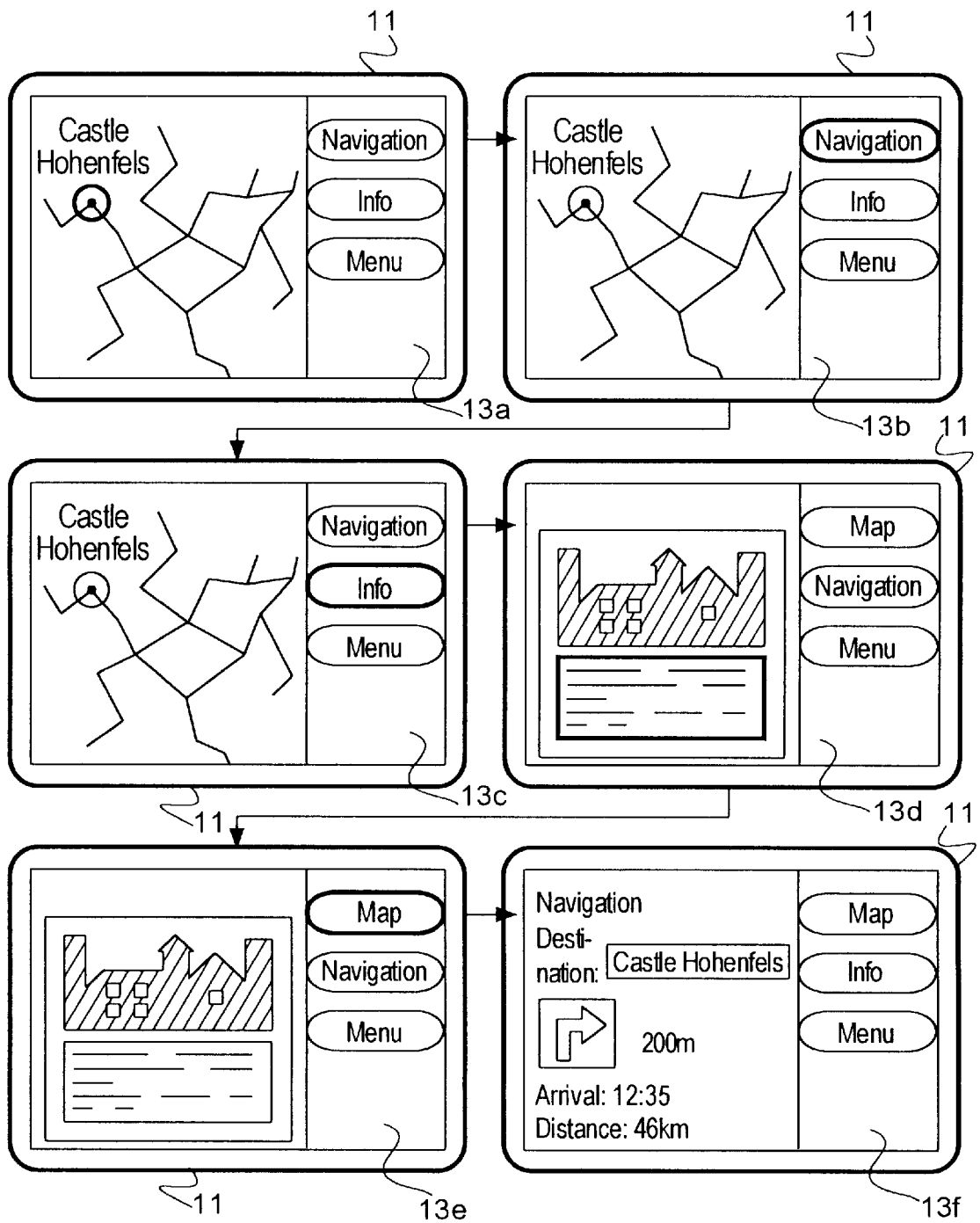
FIG. 4 shows six successive screen displays of a second embodiment in which a respective individual function group is associated with individual functions.

FIG. 4 shows the display screen 11 with six successive screen displays 13a, 13b, 13c, 13d, 13e and 13f of a second embodiment.

In the display 13a the function "map" has been addressed. Within the function "map" the map element "Castle Hohenfels" has been selected, and hence optically accentuated, as a sub-function element. With the map element "Castle Hohenfels" there is associated the function group "Castle Hohenfels" with the function elements "Navigation", "Info" and "Menu".

The screen display 13b is reached by way of a pulling motion of the rotary switch 1. In this screen display 13b the function group "Castle Hohenfels"has been addressed and within this function group "Castle Hohenfels" the function element Navigation has been selected and optically accentuated.

The display 13c is reached by turning the rotary switch 1 one step clockwise. In this screen display 13c the function element "Info" has been selected in the function group "Castle Hohenfels". The function element "Info" is activated and the function "Info" is addressed by pressing the rotary switch 1. This is shown in the screen display 13b. Within the function "Info" an information element with an indicated text passage has been selected and optically accentuated as the sub-function element.

The function group "Info", having the function elements "Map", "Navigation" and "Menu", and being associated with the function "Info", is reached by pulling the rotary switch 1. The function element "Map" of the function group "Info" has been selected and optically accentuated. This is shown in the screen display 13e.

The screen display 13f is reached by rotation and subsequent pushing of the rotary switch 1. In the screen display 13f the function "Navigation" has been addressed. The function group "Navigation" associated with the function "Navigation" comprises the function elements "Map", "Info" and "Menu".

Using the function element "Menu", a hierarchically structured menu can be addressed which can also be used to address the function elements which are not associated with the function "Navigation" and hence are not present in the function group "Navigation".

In the above example there are three functions "Info", "Map", "Navigation" which can all co-operate with the same sub-function element "Castle Hohenfels". The user has selected the sub-function element "Castle Hohenfels" in the function "Map" and the system makes the function elements "Navigation", "Info" and "Menu" available in the function group "Castle Hohenfels". If there were no further information concerning the Castle Hohenfels, the function element "Info" would not appear in the function group "Castle Hohenfels".

I claim:

1. An electronic system for selecting and activating functions from different groups of functions and for activating an apparatus, the system comprising:
  a display which shows different functions arranged in function groups, each function representing the implementation of an apparatus function;
  a bidirectional control element being actuable in a rotary direction and capable of being pushed or pulled, the control element being coupled to the display, wherein a function shown on the display is selected by rotating the control element and the function is activated by pushing the control element and the last activated function is exited by pulling the control element.

2. The electronic system of claim 1, wherein the control element is a rotary knob.

3. The electronic system of claim 1, wherein the function groups are hierarchically structured and that a respective pulling motion of the control element addresses a respective higher level function group.

4. The electronic system of claim 1 wherein a respective function group with individual function elements is associated with each of the individual functions and a respective pulling motion of the control element is provided so as to switch back and forth between the function and the function group associated with the function.

5. The electronic system of claim 1, wherein the control element is biased in the direction of a central position so that the control element automatically returns to the central position when it is released.

6. The electronic system of claim 1, wherein the control element is coupled to an increment member which subdivides the rotation of the control element into discrete steps.

7. The electronic system of claim 1, wherein the apparatus is a vehicle, and the functions further comprise:
  a navigation function which causes the vehicle to display position data when the navigation function is activated by the control element;
  an on-board computer function which causes the vehicle to measure and display vehicle operation data when the on-board computer function is activated by the control element; and
  a radio function which causes the vehicle to activate a radio when the radio function is activated by the control element.

8. The electronic system of claim 1, wherein the apparatus is an automotive data system and the functions further comprise:
  a map function which causes the automotive data system to display a map on the display when the map function is activated by the control element;
  a navigation function which causes the automotive data system to display information relating to the distance and direction of a location when the navigation function is activated by the control element; and
  an information function which causes the automotive data system to display data relating to a location when the information function is activated by the control element.

9. A control system for allowing a user to select and control the functions of different apparatus, the system comprising:
  a bidirectional control element capable of being pushed or pulled;
  a first apparatus having at least two different functions coupled to the control element;
  a second apparatus having at least two different functions coupled to the control element;
  wherein a function of the first apparatus is selected by rotating the control element to select a first function group sub-menu, said selected function is activated by pushing the control element and deactivated by pulling the control element; and
  wherein a function of the second apparatus is selected by rotating the control element to select a second function group sub-menu, said selected function is activated by pushing the control element and deactivated by pulling the control element.

10. The control system of claim 9, wherein the control element is a rotary knob.

11. The electronic system of claim 9, wherein the control element is biased in the direction of a central position so that the control element automatically returns to the central position when it is released.

12. The electronic system of claim 9, wherein the control element is coupled to an increment member which subdivides the rotation of the control element into discrete steps.

13. The control system of claim 9 further comprising a display, the display showing the first function group sub-menu when the first function group is selected by the control element, and showing the second function group sub-menu when the second function group is selected by the control element.

* * * * *